United States Patent [19]

Belfer et al.

[11] Patent Number: 5,649,086

[45] Date of Patent: Jul. 15, 1997

[54] SYSTEM AND METHOD FOR PARAMETER-BASED IMAGE SYNTHESIS USING HIERARCHICAL NETWORKS

[75] Inventors: Russell Belfer, Palo Alto; Chie-Jin Cheng, Cupertino; Steve Librande, Milpitas; Va-On Tam, Sam Mateo; Bin Zhang, Milpitas, all of Calif.

[73] Assignee: nFX Corporation, Cambridge, Mass.

[21] Appl. No.: 401,023

[22] Filed: Mar. 8, 1995

[51] Int. Cl.$^6$ ................................................ G06T 11/00
[52] U.S. Cl. ........................ 395/141; 395/133; 395/173
[58] Field of Search .................................. 395/141, 133, 395/135, 152–154; 382/293–300, 308

[56] References Cited

U.S. PATENT DOCUMENTS 5,325,475  6/1994  Poggio et al. .................... 395/133

OTHER PUBLICATIONS

Librande, Steve, "*Example-Based Character Drawing*", Massachusetts Institute of Technology 1992.

Poggio, Tomaso, et al., "*Networks for Approximation and Learning*", Proceedings of the IEEE, vol. 78, No. 9, Sep. 1990.

Cassell, Justine, et al., *Animated Conversation: Rule-based Generation of Facial Expression, Gesture & Spoken Intonation of Multiple Conversational Agents*, Computer Graphics Proceedings, Annual Conference 1994, pp. 413–420.

Waters, Keith et al., *DECface: An Automated Lip-Synchronization Algorithm for Synthetic Faces*, Digitial Equipment Corporation, Sep. 23, 1993.

*Primary Examiner*—Almis R. Jankus
*Attorney, Agent, or Firm*—Stuart P. Meyer

[57] ABSTRACT

Synthesis of novel images from example images is achieved by interpolating among example images based on user selection of parameter values in a hierarchy of networks referred to as parent networks and child networks. Child networks describe distinct physical characteristics of the image, such as thickness of eyebrows. Parent networks describe more general or abstract characteristics related to the image, such as emotional states expressed by the image.

11 Claims, 7 Drawing Sheets

SYSTEM AND METHOD FOR PARAMETER-BASED IMAGE SYNTHESIS USING HIERARCHICAL NETWORKS

FIELD OF THE INVENTION

The present invention relates generally to image processing, and specifically to the parameter-based generation of novel images using hierarchical networks.

DESCRIPTION OF BACKGROUND ART

There exist numerous techniques for synthesizing images such as those of human faces. These techniques find application both in creating still images of faces, and in animating sequences of such images to create moving pictures in which such faces may speak and otherwise move.

Human face animation has traditionally been performed by drawing a large number of individual frames that are displayed in sequence. This process is notoriously labor-intensive and often requires large numbers of artists working together to generate enough frames for a film "clip" of any significant length.

One early technique for synthesizing single images of faces involved horizontally dividing the image of a face into bands for hair, eyes, nose, mouth, and chin, respectively. Paper strips containing exemplary features could then be combined to form a "composite" drawing of a face. Such techniques found application in law enforcement, where composite drawings were created to aid in the identification of criminal suspects.

More modern techniques base animation on photographic images of actual people, or generate three-dimensional computer models that are projected to a screen for display. Human physiognomy has also been mathematically modeled based on the underlying musculature or photographic examples. Some mathematical modeling of faces have used a few parameters to control the expression of a synthesized face.

Automated systems that synthesize new images based on interpolation among example images have applicability in a wide range of industries. One disadvantage of known systems, however, is that the number of examples needed to fully populate an "example space" providing all combinations of the extremes of varying features grows quickly to an unmanageable number as the number of varying features increases. For instance, four example images are needed to fully define an example space of a human face animation if the only parameters that vary are (i) whether the face is smiling or not and (ii) whether the face is open-mouthed or closed-mouthed. However, by adding just two more variable parameters, e.g., whether the face has eyes looking left or looking right, and whether the eyelids are open or squinting, increases the number of required examples to 16. In such known systems, the number of examples required to fully populate an example space is, in general, exponential, so that if n features are allowed to vary, $2^n$ examples will be required. Accordingly, if it is desired for more than a few features to be variable, the number of examples may exceed the storage and processing capabilities of conventional microcomputers.

Several known techniques for image synthesis are described and referenced in S. Librande, EXAMPLE-BASED CHARACTER DRAWING, Thesis for Degree of Master of Science in Visual Studies, Massachusetts Institute of Technology (1992), the contents of which is incorporated herein by reference.

None of the known implementations and techniques, however, have solved the problem of synthesizing and animating a human face based on user provided specification of parameters, using low-cost and simple computer apparatus. Furthermore, none of the known implementations and techniques have provided a usable system for people who are neither artists nor technically inclined to draw human faces with the aid of a computer.

The limitations of the known implementations and techniques have heretofore circumscribed the uses and applications for image processing of human faces and other objects, and further have slowed the development of image processing applications that might benefit from an implementation not burdened by such limitations.

DISCLOSURE OF THE INVENTION

In accordance with the present invention, an image, such as that of a human face, is synthesized by combining and modifying exemplar image portions that are indexed as to characteristics and parameters, and that are arranged into a hierarchical network. Specifically, numerous features that provide detail for an image are associated into child networks. Parent networks, under the control of higher-level parameters, control the child networks to produce an image. As an example, separate child networks are provided for various facial features such as hair, eyes, nose, and mouth, and these networks are hierarchically arranged into one or more parent networks to produce an image of a face.

Hierarchical networks are trained by establishing correspondences between exemplar images of each feature and parameters by which such features are defined. Then, novel images are synthesized by user selection of such parameters and assembly of the various features into an overall image.

Because the child and parent networks are arranged hierarchically, fewer example images are needed to populate an example space than otherwise would be required. For example, consider the case where it is desired that eight features are to vary in the image of a face, two for eyes (look left or right, and eyes open or squinted), two for nose (bridge hooked or curved, and nostrils visible or not), and two for mouth (smiling or not, and mouth open or closed). Using known techniques, $2^6$, or 64, example images of a complete face, would be required to permit interpolation among these parameters. However, in accordance with the present invention, only 4 eye images, 4 nose images, and 4 mouth images are required. Thus, the total number of examples is greatly reduced from 64 to 12, and each example image is less complex.

In another aspect of the invention, a user interface is presented that allows user selection of parameter values, and the synthesis of the image is performed based on the selected parameters.

The features and advantages described in the specification are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BEST MODE FOR CARRYING OUT THE INVENTION

The figures depict a preferred embodiment of the present invention for purposes of illustration only. Those skilled in the art will readily recognize from the following discussion that alternative embodiments of the structures and methods illustrated herein may be employed without departing from the principles of the invention described herein.

Figure 1:
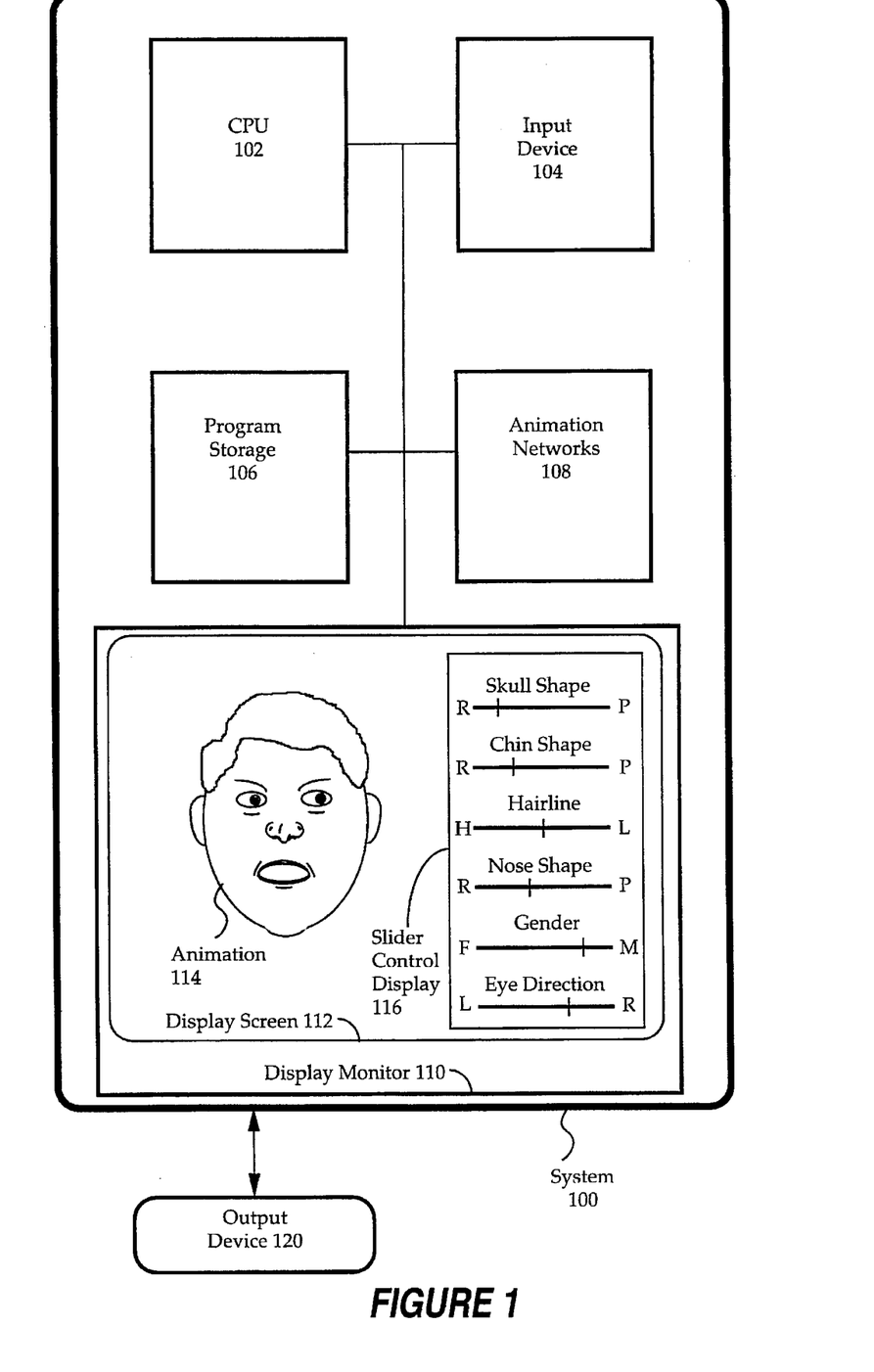
FIG. 1 is a block diagram of an image processing system (100) in accordance with the present invention.

Referring now to FIG. 1, there is shown an image processing system 100 in accordance with the present invention. Image processing system 100 is comprised of a central processing unit (CPU) 102, an input device 104, program storage 106, animation networks 108, and a display monitor 110. In operation, system 100 provides two modes of operation. A first mode, known as a "learning" mode, is used to define parameters for the later synthesis of novel images, and is also used to populate an "example space" that provides exemplar images that would result from extreme settings of such parameters. A second mode, known as "run-time" mode, allows a user to synthesize novel images by setting desired parameter values and interpolating among the exemplars based on those parameter values. In a preferred embodiment, run-time mode operation allows a user to see, in real time, the effect of changes of parameter values on the resultant output image. For instance, the user may have a slider control on a graphical user interface that allows adjustment of a facial image from "sad" to "happy", and can immediately see the effects of varying that control.

Exemplar image information is stored and indexed according to various characteristics in animation networks 108. CPU 102, under the control of program storage 106, presents a slider control display 116 on a display screen 112 of display monitor 110. Display screen 112 also displays the animation 114 resulting from user input via slider control display 116. Animation 114 may be sent for further display, printing, or typesetting in a conventional manner by use of an attached output device 120, which may be a projection monitor, a laser printer, a phototypesetter, or other common output device.

In a preferred embodiment, CPU 102 is implemented by a conventional personal computer; input device 104 is implemented by the combination of a conventional keyboard, a conventional mouse, and a conventional digitizer; and program storage 106 is implemented by a conventional hard disk drive that is integral with the personal computer used to implement CPU 102. In a preferred embodiment, animation networks 108 are also implemented by stored program instructions and data controlling the operation of CPU 102. It should be recognized that animation networks 108 could also be implemented in other manners, such as in dedicated hardware circuitry or in a combination of firmware instructions and hardware.

Slider control display 116 provides a number of user interface selections for various parameters of an image to be synthesized. In the example shown in FIG. 1, the user may select a skull shape that is rounded or pointed, a chin shape that is rounded or pointed, a hairline that is high or low, a nose shape that is rounded or pointed, a gender that is feminine or masculine, and eye direction that is right or left. By use of input device 104, which may include a keyboard, a mouse, a digitizer, or any combination of conventional input devices, a user of system 100 may adjust each of the slider controls continuously from one extreme to the other. As a result of such selection, the image to be synthesized is provided with corresponding features.

In the example illustrated in FIG. 1, some of the features selectable using slider control display 116 are specific and relate to precise elements of the face to be synthesized (e.g., as eye direction relates to pupil and iris placement), while others are more generalized (e.g., "gender" parameter relates to a number of characteristics, as more fully described below). The more generalized parameters are provided through the use of hierarchical networks. A hierarchical network is a ranked organization or relationship among simple characteristic features.

Figure 4:
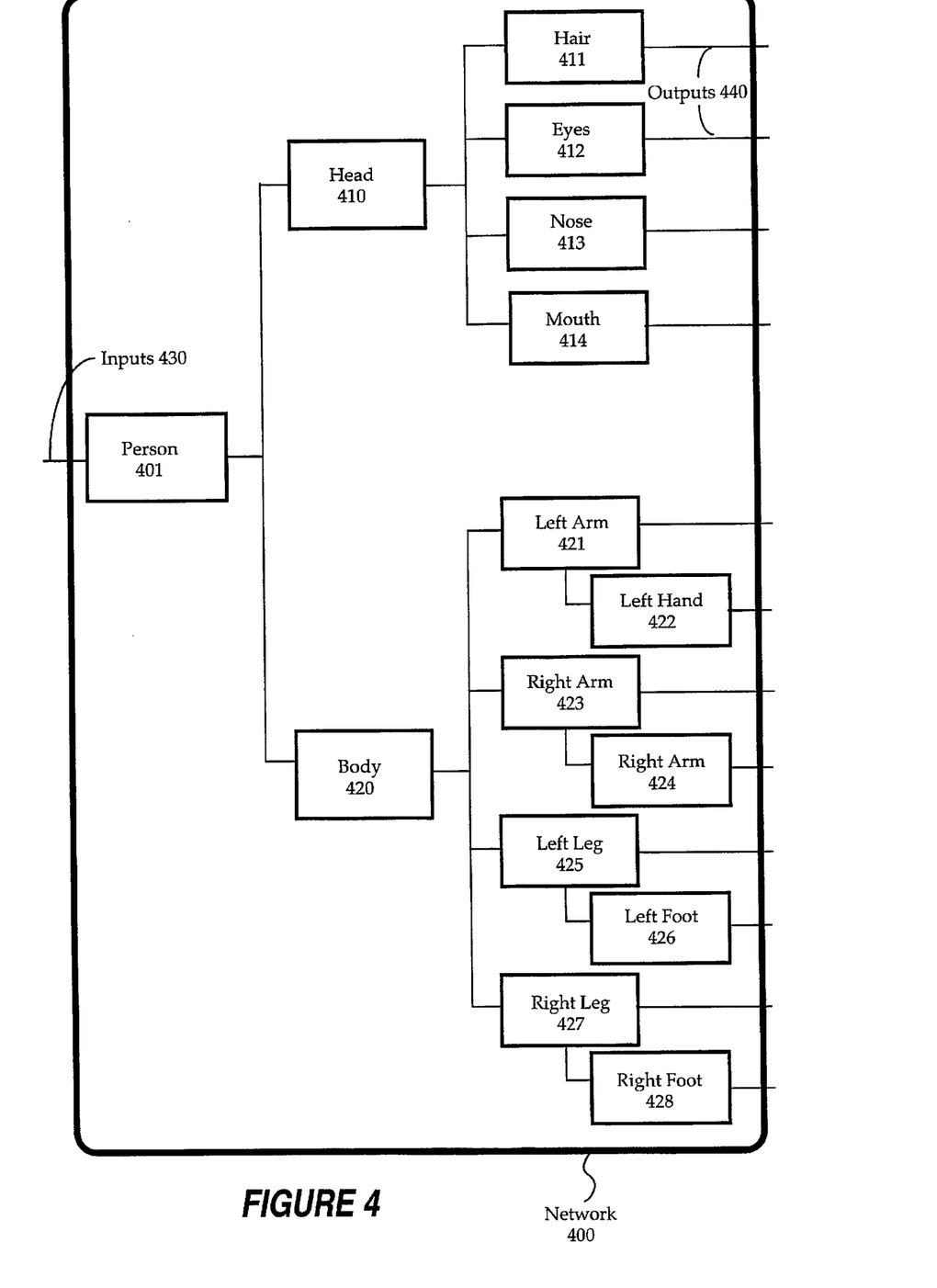
FIG. 4 illustrates a hierarchical network comprising subordinate networks, in accordance with the present invention.

Referring now also to FIG. 4, an example of a hierarchical network 400 is shown. Network 400 in this case includes a person network 401, which is itself comprised of a head network 410 and a body network 420. Head network 410 includes hair network 411, eyes network 412, nose network 413, and mouth network 414. Body network 420 includes left arm network 421 that has a left hand network 422, a right arm network 423 that has a right hand network 424, a left leg network 425 that has a left foot network 426, and a right leg network that has a right foot network 428. In a preferred embodiment, each of the networks of FIG. 4 is implemented as a regularization network such as the known gaussian radial basis function (RBF) type of network or the multi-linear type of network known in the art and discussed below. Networks 401, 410, 420 are termed "parent" or "integration" networks because they integrate control over plural subordinate networks. User control may be provided to a parent network, e.g., using inputs 430 of person network 401, in order to change characteristics of subordinate networks. Synthesis of an image in accordance with the user control is accomplished by using outputs of networks that are lowest in the hierarchy ("child" networks), e.g., outputs 440 of networks 411–414 and 421–428, as drawing attributes. These drawing attributes provide graphics primitives to a conventional marking engine for display on a monitor, printer, or other output device, or may be stored for subsequent processing.

Although three levels of networks are illustrated in FIG. 4, it should be recognized that more complex networks having more levels could also be implemented for use as described herein.

Hierarchical networks are analogous to a mass production assembly line—interchangeable parts are assembled into subsystems, which are themselves assembled into final products. Again using the example of a human face, the interchangeable parts may be eye networks, nose networks, ear networks and mouth networks; after each of these networks is trained independently based on a small set of examples, a user may assemble them on a face skeleton to produce a complex face network. It should be recognized that networks as described herein will find application not only in the area of human face image synthesis, but in diverse other areas as well. As an example, images of complex three-dimensional objects, such as machine components, may be synthesized using such networks. Such networks may also be used to synthesize not just images of such physical objects, but the physical objects themselves, based on manufacture or assembly of component parts under the control of user adjustable high-level parameters.

Referring again to FIG. 1, system 100 is implemented by storing the various features, or "objects," of a face in animation networks 108. For example, an animation network for noses might include ten exemplars. Each of these exemplars is indexed with respect to a number of characteristics. For instance, characteristics of a nose might be length, width of nostrils, width of tip, whether the nostrils are hidden or flared, and whether the bridge of the nose is sloped (concave) or hooked (convex). These characteristics may each be described on a continuum, as shown in Table 1below:

TABLE 1

| Characteristic | Scale | Explanation |
| --- | --- | --- |
| Length of Nose | 0–100 | 0 = very short; 100 = very long |
| Width of Nostril | 0–100 | 0 = very narrow; 100 = very wide |
| Width of Tip | 0–100 | 0 = very narrow; 100 = very wide |
| Nostril Flare | 0–100 | 0 = completely hidden; 100 = completely flared (visible) |
| Bridge Curvature | 0–100 | 0 = very sloped (concave); 50 = straight; 100 = very hooked (convex) |

Thus, a set of 10 exemplars may be photographs of real people, and may be described as shown in Table 2 below:

TABLE 2

| Identifier | Length | Width1 | Width2 | Flare | Curvature |
| --- | --- | --- | --- | --- | --- |
| Exemplar1 | 95 | 34 | 40 | 43 | 62 |
| Exemplar2 | 06 | 44 | 38 | 61 | 36 |
| Exemplar3 | 45 | 98 | 70 | 63 | 32 |
| Exemplar4 | 41 | 14 | 30 | 43 | 72 |
| Exemplar5 | 55 | 74 | 80 | 63 | 30 |
| Exemplar6 | 45 | 24 | 08 | 23 | 82 |
| Exemplar7 | 47 | 43 | 70 | 93 | 52 |
| Exemplar8 | 49 | 37 | 32 | 06 | 66 |
| Exemplar9 | 53 | 34 | 40 | 43 | 92 |
| Exemplar10 | 45 | 54 | 50 | 55 | 13 |

Each of the exemplars in this set has been selected because it exhibits at least one characteristic nearly to an extreme. If exemplars are drawn or otherwise created exclusively as exemplars, it should be possible to create examples having characteristics that attain each of the extremes. Where exemplars are taken from existing stock images, however, all such extreme characteristics may not be available.

In operating the system 100 in a run-time mode, the user sets a desired value for each of indexed characteristic of a human nose. In response, a new nose object is synthesized by interpolating among the exemplars. For instance, if a highly aquiline nose is desired, the interpolation will strongly favor Exemplar10. In practice, it has been found that extrapolation from values provided by exemplars also provides acceptable results.

In many instances, the characteristics described above may be more numerous than is optimal for a particular application. For example, consider an animation application in which one might want to repeatedly transform an image of a face from one expressing surprise to one expressing disgust. The transformation from surprise to disgust typically transforms a face in a manner that is predictable with respect to each of a number of characteristics. Surprise is often expressed in human physiognomy by dropping the jaw and raising the eyebrows, which tends to elongate the entire face. With respect to the nose, the tip of the nose often droops, causing the length of the nose to increase, the nose to become slightly more hooked, and the nostrils to become less flared and less wide. Disgust is often expressed by tightening the muscles over the cheekbone, which curls the upper lip and makes the face generally shorter than normal. The nose typically becomes shorter and more sloped, with the nostrils becoming wider and more flared.

In this example, a single parameter, covering the continuum from surprise to disgust, may be used to modify all of the nasal characteristics by which the exemplars are indexed. By determining the degree and direction of correlation between a parameter and each of the indexed characteristics, a single user control for a "surprise/disgust" parameter controls all of the characteristics.

Using this example, a change in the parameter control of +10 points (out of a scale of 0 to 100, where 0 represents complete surprise and 100 represents utter disgust) might change each of the characteristics discussed above as shown in Table 3 below:

TABLE 3

| Characteristic | Change |
| --- | --- |
| Length | −15 |
| Nostril Width | +10 |
| Tip Width | +5 |
| Flare | +8 |
| Hook | −6 |

As another example, it may be desirable in certain applications to allow description of a face as being more masculine or more feminine. In one embodiment, a "gender" control continuously adjustable from 0 (male or M) to 100 (female or F) provides the following hierarchical network control by linearly adjusting characteristic values over the ranges indicated in Table 4 below:

TABLE 4

| Integration Network | Low-level Network | Range (M to F) |
| --- | --- | --- |
| Eye Frame | Eyebrow Height: Low–High | 68–48 |
|  | Eyes: Close–Separated | 34–26 |
| Eyes | Closed–Open | 20–47 |
|  | Wide–Narrow | 24–29 |
| Eyebrows | Straight–Curved | 0–40 |
|  | Narrow–Wide | 46–44 |
|  | Thin–Thick | 43–0 |
| Pupils | Irises: Large–Small | 50–30 |
|  | Pupils: Large–Small | 50–0 |
| Mouth | Lips: Fluted–Smooth | 62–42 |
|  | Lower Lip: Thin–Thick | 18–49 |
|  | Narrow–Wide | 49–37 |
|  | Upper Lip: Thin–Thick | 10–33 |
| Nose | Pointed–Round | 48–63 |
|  | Nostrils: Hidden–Flared | 36–0 |
|  | Narrow–Wide | 70–22 |
| Skull | Chin: Narrow–Wide | 63–17 |
|  | Eye Frame Line: High–Low | 46–61 |
|  | Mouth Line: High–Low | 36–41 |
|  | Nose Line: High–Low | 66–62 |
|  | Narrow–Wide | 61–46 |

In another embodiment, facial features are grouped into the following categories for purposes of creating hierarchical animation networks 108: skull shape, eye frame, left eye, right eye, left eyelid, right eyelid, left eyebrow, right eyebrow, nose, mouth, hair, ears. In this embodiment, characteristics in each group are as shown in Table 5 below:

TABLE 5

| Network | Characteristic | Range |
| --- | --- | --- |
| Skull Shape | Skull | Narrow–Wide |
| | Chin | Narrow–Wide |
| | Eye Line | High–Low |
| | Nose Line | High–Low |
| | Mouth Line | High–Low |
| | Jowls | None–Full |
| Eye Frame | Eyes | Close–Far |
| | Brow Height | Low–High |
| | Pupil Direction (Horiz.) | Left–Right |
| | Pupil Direction (Vert.) | Up–Down |
| Eye (L,R) | Pupil Size | Small–Large |
| | Iris Size | Small–Large |
| Eye Lid (L,R) | Eye Width | Wide–Narrow |
| | Openness | Closed–Opened |
| | Bags | Not Baggy–Baggy |
| Eyebrow (L,R) | Brow Width | Narrow–Wide |
| | Thickness | Thin–Thick |
| | Curvature | Straight–Curved |
| | Angle | Horizontal–Steep |
| Mouth | A Sound Mouth Shape | Mild–Extreme "A" Sound |
| | B Sound Mouth Shape | Mild–Extreme "B" Sound |
| | C Sound Mouth Shape | Mild–Extreme "C" Sound |
| | F Sound Mouth Shape | Mild–Extreme "F" Sound |
| | L Sound Mouth Shape | Mild–Extreme "L" Sound |
| | OO Sound Mouth Shape | Mild–Extreme "OO" Sound |
| | U Sound Mouth Shape | Mild–Extreme "U" Sound |
| | Top Lip | Thin–Thick |
| | Bottom Lip | Thin–Thick |
| | Smile | Frown–Smile |
| | Lip Type | Fluted–Smooth |
| Nose | Length | Short–Long |
| | Nostril Width | Narrow–Wide |
| | Tip Width | Narrow–Wide |
| | Flare | None–Full |
| | Bridge Curvature | Slope–Full |
| Hair | Width | Narrow–Wide |
| | Eye Line | High–Low |
| | Bang Length | Short–Long |
| | Thickness | Thin–Thick |
| | Part | Left–Right |
| | Hairline | Recede–Full |
| Ears | Width | Narrow–Wide |
| | Flatness | Flat–Protruding |
| | Ear Length | Short–Long |
| | Lobes | None–Full |
| Chin | Shape | Pointed–Squared |

As an example of the hierarchical nature of these networks, the entire eye frame network is vertically positioned based on the eye line parameter value of the skull network. The eye frame network, in turn, controls the eye, eyelid, and eyebrow networks. Thus, a change in a parameter of the skull network may propagate through the eye frame network and cause numerous changes in the eye, eyelid, and eyebrow networks.

Figure 2:
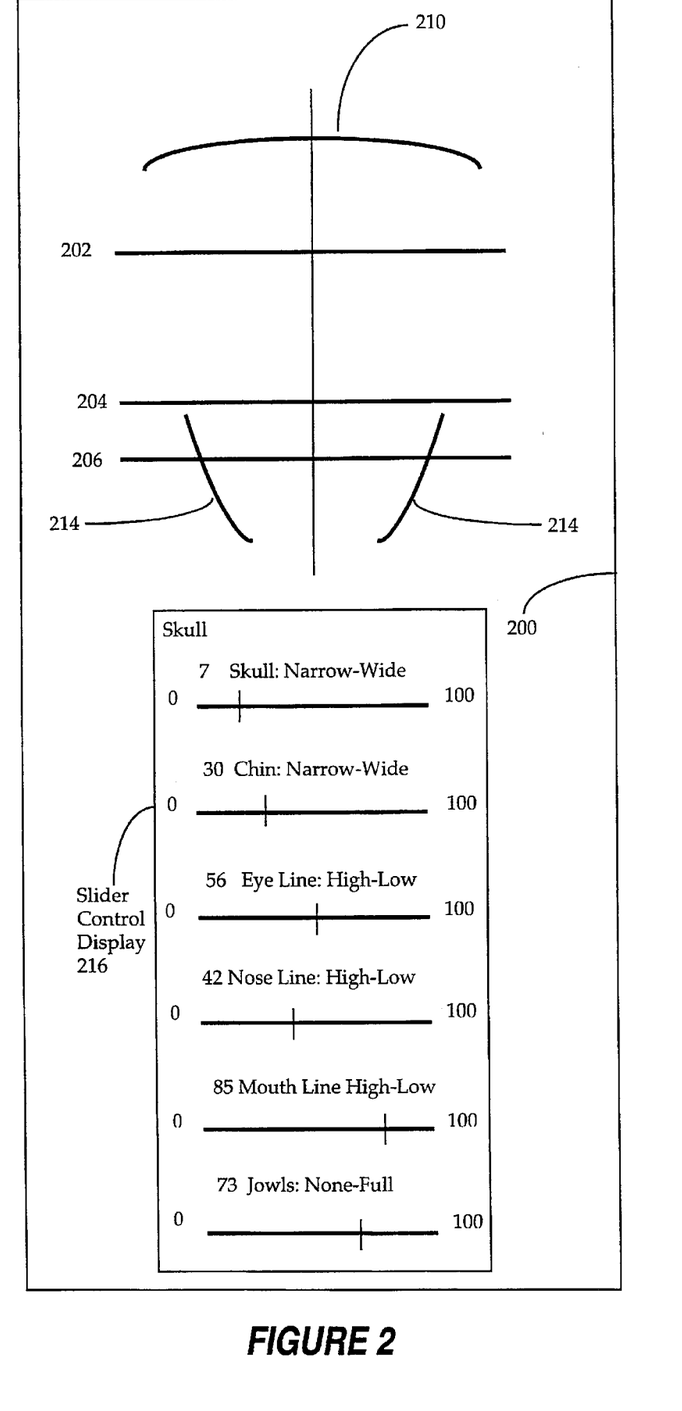
FIG. 2 illustrates operation of a skull parameter network in accordance with the present invention.

Referring now to FIG. 2, there is shown a skull animation network 200 in accordance with the present invention. Network 200 is based on six characteristics. Skull width is illustrated by line 210. Chin width is illustrated by lines 214. Eye line 202 determines where the eye frame is to be centered. Nose line 204 determines where the nose is to be centered. Mouth line 206 determines where the mouth is to be centered.

A slider control display 216, used in conjunction with skull animation network 200, allows a user to enter subjective parameter values in the training mode of operation and enter desired parameter values in the run-time mode of operation, as described more fully below. The number to the left of the slider identifier (e.g., 7 for skull width) indicates the value of the corresponding characteristic, based on the placement of the slider bar.

Figure 3:
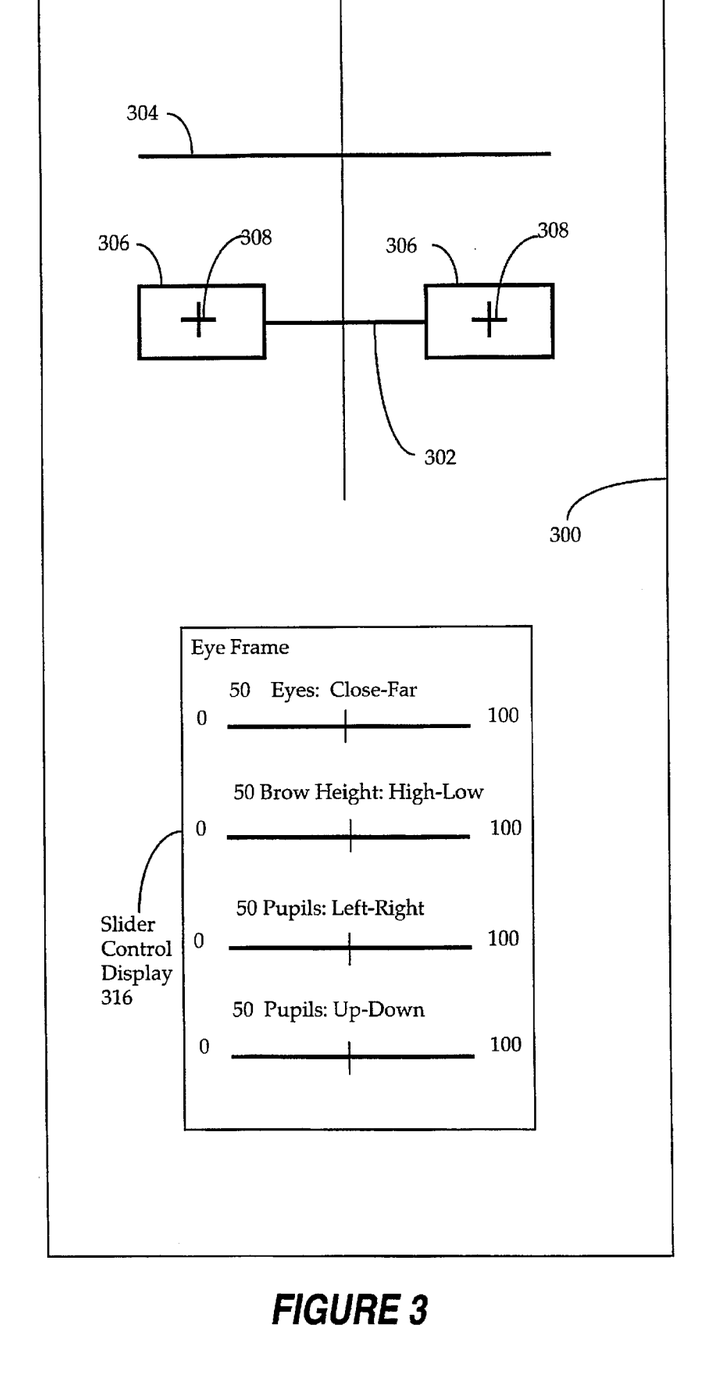
FIG. 3 illustrates operation of an eye frame parameter network in accordance with the present invention.

Referring now to FIG. 3, there is shown an eye frame animation network 300. Network 300 is based on four characteristics. Eyebrow line 304 determines placement of the eyebrows. Eye frame 302, 306 determines the width of the eyes from one another. Pupil location markers 308 determine whether the eyes are looking to the right or left, and up or down. Slider control display 316 used in conjunction with eye frame network 300, allows a user to enter subjective parameter values in the training mode and enter desired parameter values in the run-time mode.

Figure 5:
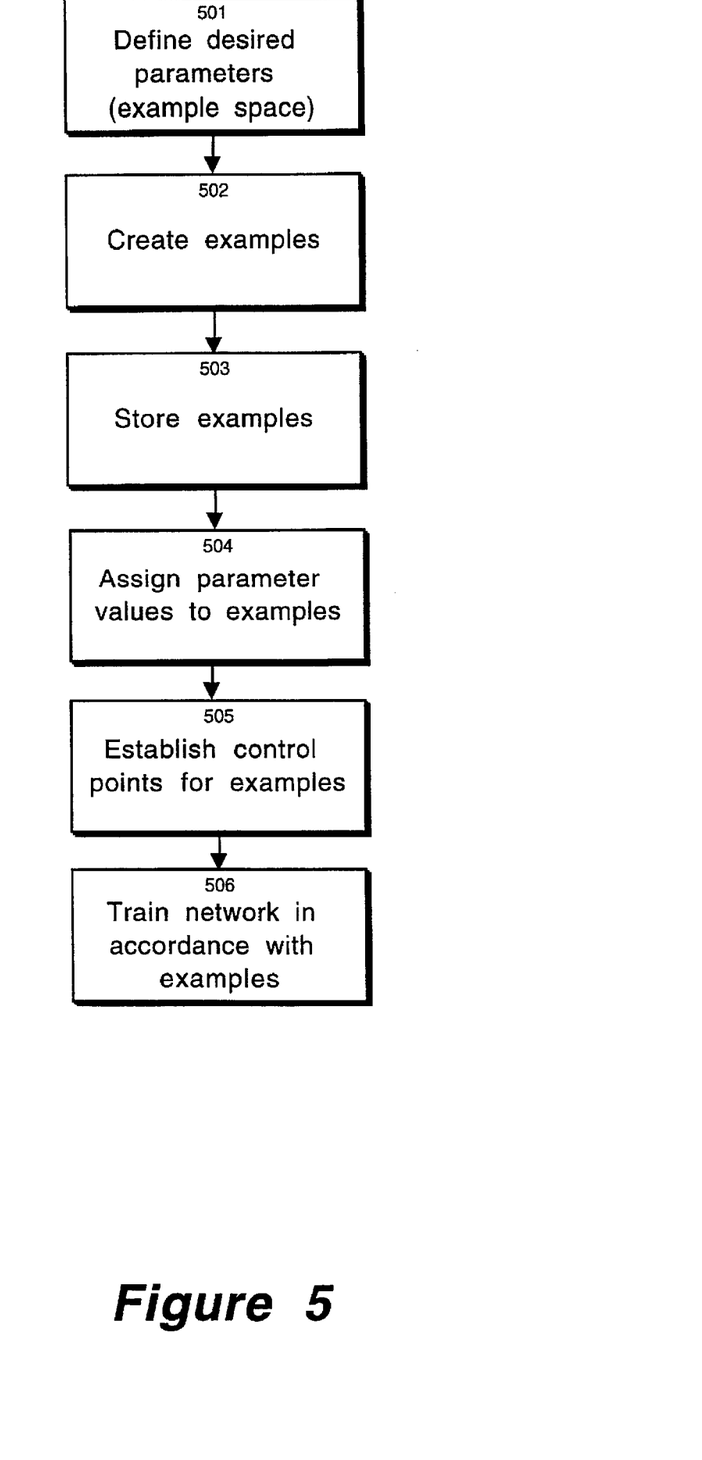
FIG. 5 is a flow diagram illustrating training mode processing to create child networks in accordance with the present invention.

Referring now to FIG. 5, there is shown a flow diagram of processing to create one of the animation networks 108 that is a lowest-level or child network. In general, such hierarchical networks 108 are produced and trained from the bottom up—parts at the most simple level are produced and trained first, then the next level parts, and so on. It should be noted that bottom-up training does not necessarily imply that a network so trained need then be used in a bottom-up manner, but may instead be used in a top-down fashion. In producing a new network, the first task is to define 501 the characteristics, or parameters, that will control the network. For instance, a simple eye network might have four such parameters: (i) direction of look (left to right); (ii) gaze (open-eyed to squinting); (iii) pupil size (small to large); and (iv) iris size (small to large). Once these parameters are defined, the next task is to provide 502 examples that represent the extremes of these parameters. Put another way, the definition of four eye parameters inherently defines a corresponding four dimensional "eye space" that may be used for parameterizing any new eye image. To give such parameters meaning, it is desirable to find examples that lie at all of the extremes of the "eye space." Continuing with this example, 16 example eye images would be sought, as shown in Table 6 below:

TABLE 6

| Example | Direction | Gaze | Pupil Size | Iris Size |
| --- | --- | --- | --- | --- |
| 1 | Far Left | Wide Open | Very Small | Very Small |
| 2 | Far Left | Wide Open | Very Small | Very Large |
| 3 | Far Left | Wide Open | Very Large | VerY Small |
| 4 | Far Left | Wide Open | Very Large | Very Large |
| 5 | Far Left | Tight Squint | Very Small | Very Small |
| 6 | Far Left | Tight Squint | Very Small | Very Large |
| 7 | Far Left | Tight Squint | Very Large | Very Small |
| 8 | Far Left | Tight Squint | Very Large | Very Large |
| 9 | Far Right | Wide Open | Very Small | Very Small |
| 10 | Far Right | Wide Open | Very Small | Very Large |
| 11 | Far Right | Wide Open | Very Large | Very Small |
| 12 | Far Right | Wide Open | Very Large | Very Large |
| 13 | Far Right | Tight Squint | Very Small | Very Small |
| 14 | Far Right | Tight Squint | Very Small | Very Large |
| 15 | Far Right | Tight Squint | Very Large | Very Small |
| 16 | Far Right | Tight Squint | Very Large | Very Large |

In some applications, these examples may be images expressly created as examples for this purpose. In other examples, they may be stock images that happen to exhibit particular characteristics, as for instance described above in connection with Table 2. As these example images ("exemplars") are created, they are also stored 503 in system 100. In a preferred embodiment, the exemplars are implemented by vector drawings to facilitate the interpolation discussed below, but other implementations, such as bit maps, may also be employed. Next, parameters are assigned 504 to each of the exemplars. In one embodiment, after the examples are created, each one of the stored images is displayed in turn, along with a slider control display for each of the parameters defined in 501. A user manipulates the slider controls to subjectively set the values for each of the characteristics for the image being displayed, and the system 100 accepts these values for association with the exemplar. It should be recognized that parameter assignments may be made at the same time as each example is created, or at some time after the examples have been created.

As described above, system 100 synthesizes images by interpolating among example images. To facilitate such interpolation, control points are assigned 505 for each of the example images. A control point is a location on an image having a known predefined meaning, to which correspondence can be made with control points from other images as a starting point for interpolation among such images. For instance, each image of an eye might include three control points to simplify later interpolation: the center of the pupil, the inner corner where the upper eyelid meets the lower eyelid, and the outer corner where the upper eyelid meets the lower eyelid. In one embodiment, these control points are manually assigned through use of a cursor control device such as a mouse. In alternative embodiments, automatic or semi-automatic image recognition techniques are used to locate desired control points on an example image. It should be recognized that control point assignment may be performed as each example image is created, as parameter values are assigned to each example image, or at some later time.

Once the parameters have been defined, the example space populated and the control points assigned, a regularization network, such as a Gaussian Radial Base Function ("RBF") type of Hyper Basis Function ("HBF") network or a Multilinear type network is trained 506 in accordance with this information. The regularization network dynamically approximates an optimal manner of interpolating among the examples. Regularization networks and their applicability to such interpolation are known in the art and are described, for example, in T. Poggio and F. Girosi, NETWORKS FOR APPROXIMATION AND LEARNING, 78:9 *Proceedings of the IEEE* 1481 (September 1990), the contents of which are incorporated herein by reference.

Figure 6:
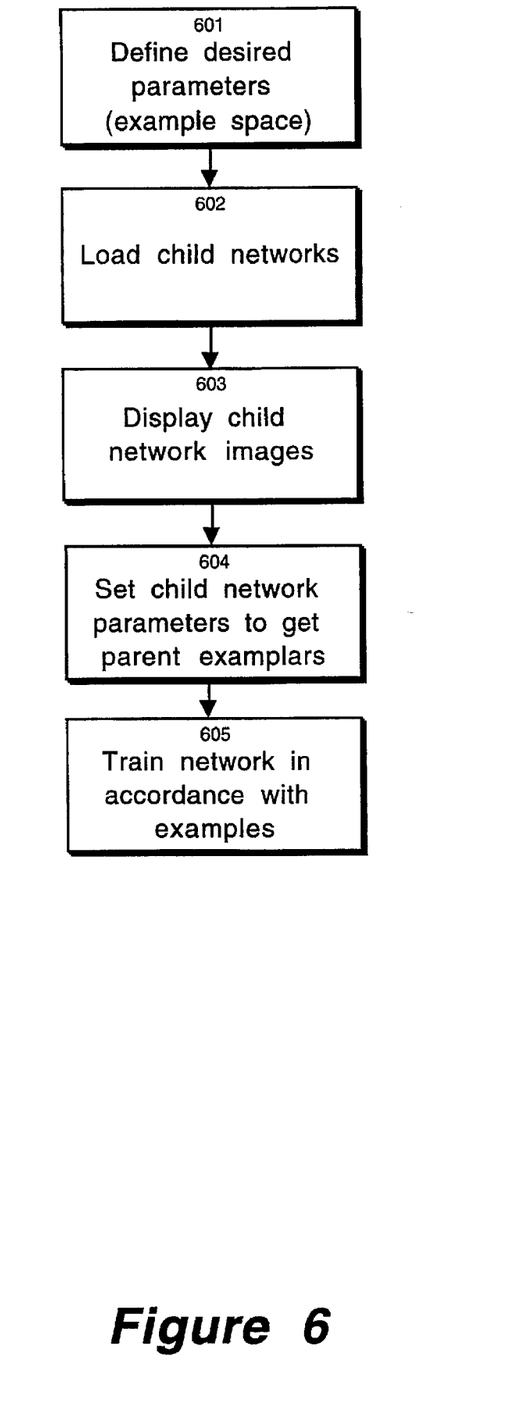
FIG. 6 is a flow diagram illustrating training mode processing to create parent networks in accordance with the present invention.

Networks above the lowest level of the hierarchy ("parent networks") use parameters of subordinate networks ("child networks") as exemplars. Referring now to FIG. 6, training of such a parent network begins by defining 601 the desired parameters for the parent network and loading 602 all child networks that will be used with the parent network. For instance, a higher level "face" network might comprise three subordinate networks: an eye network, a nose network and a mouth network. Once the subordinate networks are loaded, the child network images are individually displayed 603 on screen 112 as described below in connection with run-time mode operation illustrated in FIG. 7. At this point, the parameters of the new higher level network are ready to be set 604 in terms of the child network parameters.

Continuing the above example of a face network, one application might call for a single face network parameter related to the amount of surprise expressed by the face. For this application, increase in the face network "surprise" parameter might call for decrease in the eye network gaze parameter described above, which ranges from open-wide to squinting. Likely, increase in the face network surprise parameter would also call for changes in other lower-level network parameters, such as a parameter indicating whether the mouth is closed or open, and a parameters indicating the width and length of the nose.

Therefore, the relationships are set 604 by establishing a correspondence between each extreme combination of higher-level network parameter values and an appropriate set of child network parameter values. Continuing the above example yet further, an exemplar for the maximum value of the face network "surprise" parameter would include the minimum value of the eye network "gaze" parameter discussed above, since a state of surprise is typically expressed by a wide-open gaze.

In a preferred embodiment, parent network examples are obtained 604 from the child networks by setting the child network parameters as desired (as in run-time mode operation) while watching the resulting image until an image that appears to provide an extreme example of a particular combination of parent network parameters is obtained. For instance, if a face network is to have two parameter controls, one for amount of surprise (from no surprise to maximum surprise) and another for happiness (from very sad to very happy), the user would seek to generate four examples, each of which would correspond to one of the possible combinations of extreme settings of these parameters. A first example, therefore, would be a face that appears to have no surprise but is very sad. To obtain this example, the user would manipulate the child parameters as desired until subjectively obtaining the least surprised, saddest possible face. Then, that example would be defined as the combination of child network parameters used to create it. In a preferred embodiment, once correspondence is achieved between extreme parent network examples and child network parameter values, a linear relationship is applied to interpolate, or map, changes in a parameter of a parent network to changes in parameters of child networks. It should be recognized, however, that relationships other than a linear relationship might be desirable for some applications.

Once parameters have been defined and an example space has been populated, a regularization network is trained 605 as discussed above in connection with FIG. 5.

Figure 7:
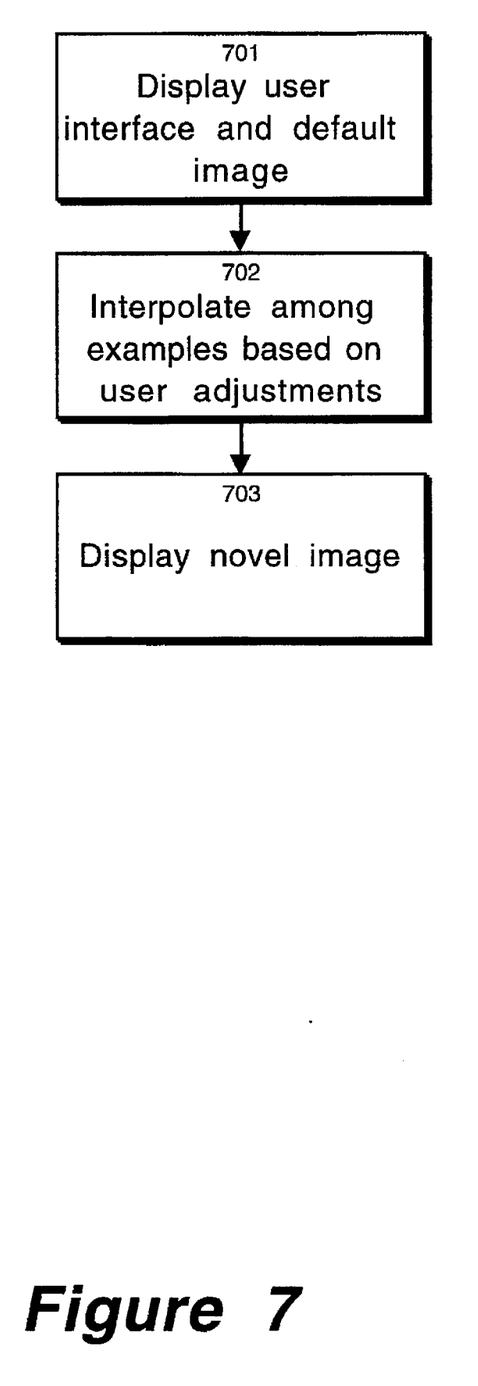
FIG. 7 is a flow diagram illustrating processing to synthesize images in accordance with the present invention.

Referring now to FIG. 7, there is shown a flow diagram of facial image synthesis using system 100. First, system 100 displays 701 a user interface screen permitting the user to select desired parameters for the image to be synthesized. In one embodiment, a default novel image based on mid-range settings of the parameters is also displayed. Some of the parameters are purely physical, e.g., chin—square or pointed, while others are more abstract, e.g., emotion—happy or sad. Examples of other abstract parameters that, system 100 is capable of handling are surprise, shock, anger, fearfulness, contentedness, tiredness, inquisitiveness, and concentration. Next, the system 100 responds to user adjustment of parameters by interpolating 702 among the stored animation networks of indexed exemplars to create corresponding novel images. In a preferred embodiment, this interpolation is performed sufficiently quickly as to be perceived as being done in real time. As stated above, a preferred embodiment employs RBF regularization as the engine for interpolation, but it should be recognized that other techniques for interpolating among images may be used.

Processing in the run-time mode of operation is completed by displaying 703 the novel image. The user may further manipulate the parameter controls as desired, and the displayed image changes accordingly.

System 100 may be used to synthesize single images, or to animate moving images. Using system 100, animation is performed by varying parameter values over time. The impression of a face that is speaking, for instance, may be achieved by varying parameters such as the mouth shapes for various sounds listed in Table 5. Adjustment of these parameters may itself be automated so that, for instance, computer-generated speech is accompanied by corresponding computer-generated animation.

Because system 100 describes images in terms of a relatively few parameters, system 100 may be used in one embodiment to compress image animation information. For example, by transmitting exemplar images to a remote location, only parameter information need be transmitted to produce animation at the remote site. Complete frames of the animated images need not be sent sequentially.

Another benefit that accrues from the use in system 100 of only a relatively small number of facial characteristics or parameters is that users who are neither artistically nor technically proficient may create faces of various types simply by manipulating the controls of slider control display 116. Accordingly, system 100 may readily be used in law enforcement for witnesses to create their own depictions of suspects, in art school for students to understand how differences in facial features are manifested in overall appearance, and in recreation for users to create faces that they find interesting or amusing.

The use of hierarchical networks permits recursive generation of libraries of reusable objects. Again using the example of human face animation, various networks corresponding to facial features may be assembled and trained to produce more sophisticated novel objects, which themselves can be used as components of even more complex networks. Unlike single-level techniques, a hierarchical network approach does not suffer exponential growth in complexity as the number of variable features or parameters grows. The division of a complex image into a hierarchy of smaller networks reduces both memory consumption and computational complexity.

It should be recognized that while the discussion above has focused on images of human faces, the system and method of the present invention readily may be applied to many other types of images as well, and further may be applied to objects other than images. For example, a computer-controlled die making machine (or wire bending machine or metal stamper) may be provided with signals from the output of a system such as system 100 to create novel physical objects based on a hierarchy of networks defining parameters of such objects.

Therefore, image synthesis is achieved by interpolating among exemplar images based on user selection of parameter values. The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

We claim:

1. A method of using a computer to synthesize an object, the object including a plurality of components, each component being capable of description by a plurality of known characteristics, the method comprising:

forming a plurality of child networks from said components responsive to corresponding ones of said known characteristics;

forming a parent network superordinate to said child networks, said parent network including a parameter, the parent network being hierarchically related to said child networks such that a change in said parameter of said parent network corresponds to changes in said corresponding ones of said known characteristics;

associating with said parameter a first parameter state and a second parameter state;

associating with each of said known characteristics a first characteristic state corresponding to said first parameter state and a second characteristic state corresponding to said second parameter state;

providing a user interface allowing user selection of a desired parameter state, said desired parameter state being bounded by said first parameter state and said second parameter state; and synthesizing said object responsive to the desired parameter state by generating a set of desired object characteristics from said first characteristic states, said second characteristic states, and said desired parameter state.

2. A method as in claim 1, wherein the object is an image of a face, wherein the known characteristics include at least one of a group of skull shape, chin shape, eye shape, nose shape, and mouth shape, and wherein said parameter represents a human emotional state.

3. A method as in claim 1, wherein the object is an image of a face, wherein the known characteristics include at least one of a group of skull shape, chin shape, eye shape, nose shape, and mouth shape, and wherein said parameter represents a direction of view.

4. A method as in claim 1, wherein the object is an image of a face, wherein the known characteristics include at least one of a group of skull shape, chin shape, eye shape, nose shape, and mouth shape, and wherein said parameter represents a gender.

5. A method as in claim 1, wherein the object is an image of a face, wherein the known characteristics include at least one of a group of skull shape, chin shape, eye shape, nose shape, and mouth shape, and wherein said parameter is one of a group including surprise, shock, anger, fearfulness, contentedness, tiredness, inquisitiveness, concentration, happiness, gender, direction of view.

6. A method as in claim 1, wherein said synthesizing includes producing an image of said object.

7. A method as in claim 1, wherein said synthesizing includes interpolating among example objects.

8. A method of using a computer to synthesize an image of a physical object, the physical object capable of being described by a plurality of known characteristics, the method comprising:

creating a computer-implemented hierarchical network to associate said characteristics with a plurality of parameters, the hierarchical network including (i) a plurality of child networks each providing correspondence between a portion of said image and a pertinent subset of said characteristics and (ii) a parent network providing correspondence between said pertinent subset for each one of said child networks and said plurality of parameters;

storing exemplars of said characteristics in the computer;

providing a user interface allowing user selection of a set of desired parameter states; and synthesizing said image by interpolating among said exemplars responsive to said set of desired parameter states.

9. An image processing system, comprising:

a central processing unit;

an input device, operatively connected with said central processing unit;

a program storage subsystem, operatively connected with said central processing unit, for storing instructions for the control of said central processing unit to provide a user with user interface controls for specifying parameters of an object to be synthesized by said image processing system; and an animation network subsystem, operatively connected with said central processing unit, said animation network subsystem comprising a parent network and at least one child network, the parent network being hierarchically related to said child network such that said parameters operate as inputs to said parent network and that said parent network generates as output characteristics that operate as inputs to said child network, said animation network subsystem and said central processing unit operating in conjunction to synthesize said object responsive to said parameters specified by said user through said user interface controls.

10. An image processing system as in claim 9, wherein said object is an image of a face, wherein said parent network formed of at least one of a group of a skull network, a hair network, an ear network, an eye frame network, a nose network, a mouth network, and a chin network.

11. An image processing system as in claim 9, wherein said animation network subsystem is comprised of a plurality of exemplars, each indexed with respect to a corresponding parameter.

* * * * *